Figure 1:
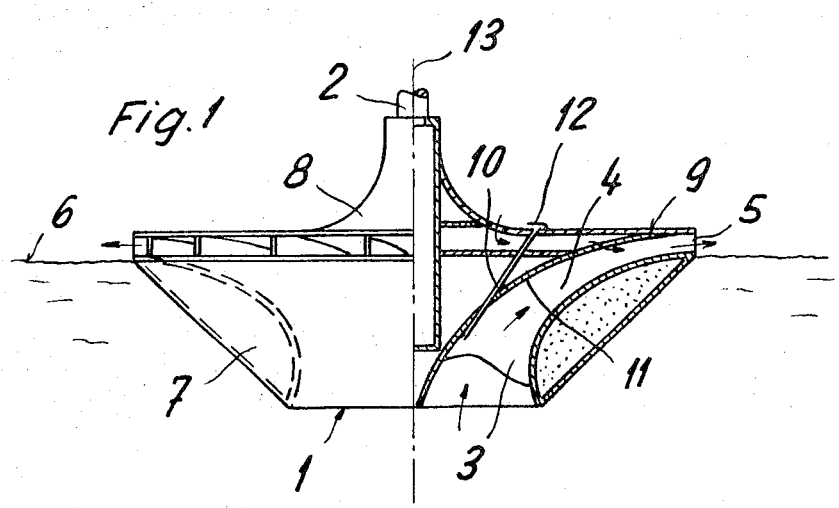

United States Patent [19]
Tofaute

[11] 3,765,656
[45] Oct. 16, 1973

[54] AERATING CIRCULATORS
[75] Inventor: Klais Tofaute, Ennetburgen, Switzerland
[73] Assignee: Norm A.M.C. AG., Buochs, Switzerland
[22] Filed: Feb. 15, 1972
[21] Appl. No.: 226,448

[30] Foreign Application Priority Data
Feb. 15, 1971   Switzerland.......................... 2186/71

[52] U.S. Cl...................................... 259/96, 261/91
[51] Int. Cl............................................... B01f 5/16
[58] Field of Search .................... 259/7, 8, 108, 107, 259/95, 96, 23, 24, 43, 44; 261/91, 93

[56] References Cited
UNITED STATES PATENTS

| | | | |
|---|---|---|---|
| 1,583,591 | 5/1926 | Greenawalt........................... | 259/96 |
| 3,576,316 | 4/1971 | Kaelin................................... | 261/91 |
| 3,610,590 | 10/1971 | Kaelin................................... | 261/91 |
| 2,991,622 | 7/1961 | Oster..................................... | 259/96 |

*Primary Examiner*—Robert W. Jenkins
*Attorney*—Warren N. Low et al.

[57] ABSTRACT

A method of and device for minimizing the formation of ice and/or the deposition of dirt on an exposed upper surface of an aerating circulator. The circulator has a portion thereof disposed beneath the surface to be aerated and another portion, including an exposed upper surface, which extends above the surface of the liquid. A rotor of the circulator is rotated to deliver the fluid by centrifugal force through radially extending supply ducts. The ducts are curved continuously from a submerged, substantially vertically disposed inlet to a substantially horizontally disposed outlet substantially at the surface of the liquid to be aerated. The method comprises diverting a portion of the liquid in the ducts by means of branch conduits and delivering the diverted liquid to the topside of the exposed upper surface.

5 Claims, 2 Drawing Figures

AERATING CIRCULATORS

This invention relates to a method for preventing the formation of ice and/or deposition of dirt on the surface of a vertical-axis aerating circulator projecting from a fluid which is to be aerated in particular waste water which is to be clarified, and to an aerating circulator for carrying out the method.

It is known to use aerating circulators to aerate waste water which is to be clarified. When clarification operations take place in the winter ice can form on aerating channel outlets of such aerating circulators and on circulator surfaces projecting from the water, and this often leads to imbalance of the circulator and thus to unsteady motion of the latter. Over a fairly lengthy operation the imbalance of the aerating circulator can lead under such conditions to damage to the base/support of the circulator.

The danger of ice forming exists principally in aerating circulators which are manufactured from plastics, e.g. glass-fibre reinforced synthetic resin or from steel. The thermal conductivity of plastics is so small or the cooling of material in the case of steel circulators is so great that upper parts of the circulator which project from the water, and are exposed to the ambient temperature, are not sufficiently heated by the lower parts which are submerged in the waste water and supplies the latter to prevent the formation of ice on the circulator channel outlets or on surfaces of the circulator projecting out of the water.

Also dirt can be deposited on the circulator surface projecting out of the water and this must be removed from time to time.

According to the present invention a part of the fluid flowing through the supply ducts of an aerating circulator is diverted and supplied to a surface of the circulator which is to be kept free of ice and/or dirt for flow over said surface.

It is expedient if the amount of fluid diverted from the fluid flowing through the supply ducts of the aerating circulator is supplied simultaneously to several spaced outlets on the circulator surface which is to be kept free of ice and/or dirt. In this respect it is advantageous if the amount of fluid diverted from the fluid flowing through the supply ducts of the aerating circulator is so guided out of several outlet locations distributed over the periphery of the circulator and housed between the outer circulator wall and the axis of rotation of the circulator over the circulator surface which is to be kept free of ice and/or dirt to provide overlapping streams which flow outwardly in approximately a radial manner from the outlets over said surface.

An aerating circulator for carrying out the method according to the invention is characterised by the fact that it has at least one branch conduit which at one end communicates with one of the supply ducts and at its other end opens onto the circulator surface which is to be kept free of ice and/or dirt in such a way that the latter is washed, when the aerating circulator is used, with part of the fluid flowing through the supply ducts.

It is expedient if the aerating circulator has several branch conduits which each open at one end into a supply duct and at the other end onto said surface under a covering and distributor cap, mounted on said surface.

Figure 2:
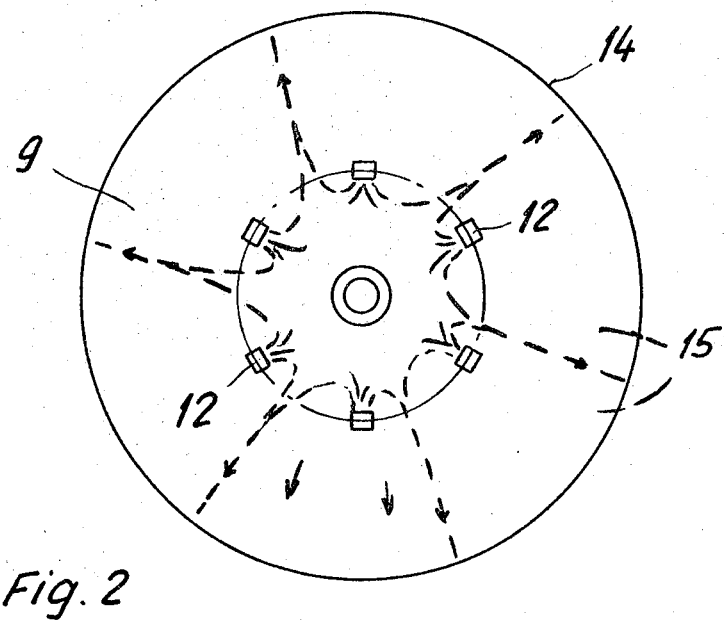

The invention will now be described by way of example with reference to the accompanying drawings in which:

FIG. 1 is a vertical elevation partly in section of an aerating circulator according to the invention; and FIG. 2 is a plan view of the aerating circulator shown in FIG. 1.

As can be seen from the drawings the aerating circulator has a rotary body 1, which is housed at the lower end of a drive shaft 2 and is non-rotatably fixed thereto. The drive for the aerating circulator is not shown.

The rotor body 1 diverges from its lower entry end upwards towards the exit end and is fitted with supply impellers 3 for supplying the waste water which is to be aerated, and supply ducts 4 located between the individual supply impellers 3.

The aerating circulator is so housed in the waste water which is to be aerated that the lower edge of the supply duct exit aperture 5 approximately at the waste water level 6, so that when the circulator is rotated the waste water located in the supply ducts 4 is caused to flow upwardly under the influence of centrifugal force and sprayed out into the air through the supply duct exit apertures 5, to rejoin the waste water surface around the circulator. Thus the rotor body 1 has a lower part 7 immersed in the waste water which is to be aerated and an upper part 8 exposed to the temperature of the ambient atmosphere.

To prevent formation of ice and/or deposition of dirt on the surface 9 of the upper rotor body part 8 projecting from the waste water, part of the waste water flowing through the supply ducts 4 is diverted and conducted up to the surface 9. This is achieved by branch conduits 10 each of which open into a supply duct 4, adjacent a radially inner dividing wall 11 of each supply channel 4. The other ends of the branch conduits 10 are each located under a covering and distribution cap 12 housed on the circulator surface 9 which is to be kept free of ice and/or dirt. The entry apertures of conduits 10, located in the supply ducts 4 are at a shorter distance from the axis of rotation of the circulator 13 than the exit apertures on the circulator surface 9. By this means the centrifugal force which is still affecting the water flowing through the branch conduits 10 can be used to supply same.

As can be seen from FIG. 2, the amount of fluid which is diverted from the waste water flowing through the supply ducts 4 is guided out of several outlets distributed over the periphery of the circulator and housed between the outer edge of the circulator 14 and the axis of rotation of the circulator 13 and fitted with covering and distribution caps 12 over the surface 9 of the circulator which is to be kept free of ice and/or dirt in such a way that the result is reciprocal contact or over-lapping of the streams 15 flowing outwardly in approximately radial manner from the outlets. By this means substantially the whole surface 9 is washed.

The covering and distribution caps 12 cause a distribution of the individual streams over a wide area. The caps can be so housed and designed that they form an outflow aperture directed radially outwards and/or radially inwards and/or in the direction of rotation of the circulator and/or opposite the direction of rotation of the circulator. The number of outlets, their position and outflow directions are so chosen that the surface 9 which is to be kept free of ice and/or dirt is washed as completely and uniformly as possible.

The branch conduits 10 and the covering and distribution caps 12 can comprise for example hard polyvinylchloride, glass-fibre reinforced synthetic resins or stainless steel and are so dimensioned that they can supply the required amount of fluid which is to be diverted from out of the supply ducts 4 substantially without the danger of a blockage.

I claim:

1. A method of minimizing the formation of ice and/or the deposition of dirt on an exposed upper surface of an aerating circulator device of the type having a substantially vertically disposed drive shaft with a portion of the circulator disposed beneath the surface of a liquid to be aerated and another portion, including said exposed upper surface, extending above the surface of said liquid, said circulator being rotated to effect centrifugal ejection of fluid through radially extending duct means, each of said ducts having a substantially vertically disposed inlet and a substantially horizontally extending outlet positioned substantially at the surface of the liquid to be aerated, said method comprising the steps of
   a. diverting a portion of the liquid flowing through said ducts,
   b. and delivering the diverted liquid to the topside of said exposed upper surface.

2. An aerating circulator comprising
   a. a rotor having a substantially vertical axis with said rotor being adapted to be rotated to deliver a fluid by centrifugal force,
   b. a plurality of radially extending supply duct means in said rotor to permit radial flow of said liquid to be aerated,
   c. each of said radially extending supply duct means having a substantially vertically disposed inlet at an open bottom of said rotor and a substantially horizontally extending outlet positioned substantially at the surface of the liquid to be aerated,
   d. said radially extending supply duct means having upper and lower surfaces which are curved continuously from said inlet to said outlet,
   e. said aerating circulator having an exposed upper wall surface disposed transversely to the vertical axis of said aerating circulator and positioned above the surface of said liquid to be aerated,
   f. each of said supply duct means being provided with branch conduit means which extends through the curving upper wall of said duct means to deliver fluid atop said exposed upper wall surface thereby minimizing the formation of ice and/or the deposition of dirt on said exposed upper wall surface.

3. A circulator as claimed in claim 2, wherein each branch conduit means has an outlet which is provided with a covering and distribution cap.

4. A circulator as claimed in claim 3, wherein the covering caps are adapted to direct liquid to flow over said surface in a predetermined direction.

5. A circulator as claimed in claim 2, wherein the conduit means is formed from polyvinylchloride, glass-fibre reinforced synthetic resin or stainless steel.

* * * * *